(12) United States Patent
Chen et al.

(10) Patent No.: US 8,077,198 B2
(45) Date of Patent: Dec. 13, 2011

(54) OBJECT POSITION DETECTION DEVICE AND METHOD THEREOF

(75) Inventors: Chia-Tseng Chen, Lugang (TW); Hsiang-Chun Kao, Lugang (TW); Hsin-Pin Yu, Lugang (TW)

(73) Assignee: Automotive Research & Test Center, Changhua County (TW)

( * ) Notice: Subject to any disclaimer, the term of this patent is extended or adjusted under 35 U.S.C. 154(b) by 645 days.

(21) Appl. No.: 12/238,503

(22) Filed: Sep. 26, 2008

(65) Prior Publication Data

US 2010/0053320 A1 Mar. 4, 2010

(30) Foreign Application Priority Data

Aug. 29, 2008 (TW) ............................... 97133265 A (51) Int. Cl.
*H04N 7/00* (2011.01)
*G09B 9/00* (2006.01)
*G06K 9/00* (2006.01)

(52) U.S. Cl. ..................... 348/135; 348/122; 382/103

(58) Field of Classification Search .................. None
See application file for complete search history.

(56) References Cited

U.S. PATENT DOCUMENTS 6,434,254 B1 * 8/2002 Wixson .................. 382/103
2006/0215881 A1 * 9/2006 Nakajima et al. ............. 382/106

* cited by examiner

*Primary Examiner* — Wen-Tai Lin
(74) *Attorney, Agent, or Firm* — Ming Chow; Sinorica, LLC (57) ABSTRACT

The present invention discloses a fast object position detection device and a method thereof, particularly to a detection device and a method thereof which can directly apply to various image systems. The device of the present invention mainly comprises an image capturing system that captures images within the regions defined by the user, and an image processing unit determining the position of an object and obtaining related information. In the method of the present invention, a captured image is converted into 1-D distance-axis signal information; a differential value of the 1-D distance-axis signal information is used to determine a position of an object; and a difference of the 1-D distance-axis signal information of at least two adjacent time points is used to determine an approaching status of an object.

15 Claims, 6 Drawing Sheets

OBJECT POSITION DETECTION DEVICE AND METHOD THEREOF

BACKGROUND OF THE INVENTION

1. Field of the Invention

The present invention relates to an object position detection device and a method thereof, particularly to a position detection device and a method thereof that utilizes an image capturing system to dynamically detect the position of an object.

2. Description of the Related Art

With the development of science and technology, distance detection technologies have been applied to many daily living facilities to promote the safety and convenience of living. For example, due to drivers are more and more concerned about driving safety nowadays, automobile manufacturers have proposed many safety schemes. Among them, collision-forewarning technologies attracts great attentions, including lane departure warning systems, vehicle parking assistance systems, and blind-spot detection systems. Especially, the blind-spot detecting systems contribute most to driving safety and are gradually valued by the market. The abovementioned blind-spot refers to the area a driver cannot watch from the rear-view mirrors. In the blind-spot detection systems, cameras are mounted on two sides of a vehicle to capture the rear-view images of blind-spots, and the driver is alerted when vehicles are approaching. Therefore, the technologies of estimating the distance of the approaching vehicle are needed by the blind-spot detection system. Among them, the distance detection radar is the most popular technology in the market. The distance detection radar adopts an ultrasonic distance detection technology, or an infrared distance detection radar, etc., to detect distance, wherein electromagnetic or ultrasonic energy is directionally emitted to space, and the energy reflected by the object in the space is used to estimate the direction, altitude and speed. Some vehicular radar may even detect the shape of an object. For example, the ground detection radar can accurately detect the profile of the ground surface. However, the vehicular radars usually have a smaller view field and have their blind spots. The range of the blind spots correlates with the number of the mounted vehicular radars. For example, the blind-spot region of a four-eyed backing radar system is better than a two-eyed backing radar system. However, a four-eyed backing radar system is double the price of a two-eyed backing radar system. Besides, the backing radar has a limited detection distance and is hard to detect an object moving in a large area. Another technology to detect a moving object is the vehicle-carried image system, which can overcome the problem of blind spots, whereby the driver can watch the images of the entire blind spots region from the display device. The prior art object recognition technology of vehicle imaging system usually adopts a gradient estimation method and an edge detection method to find the position of an object and then uses a cluster analysis method to define the position of the object. Nevertheless, the abovementioned technology still has some shortcomings to improve. Alternatively, a image comparison method is used to search different image regions. However, the recognition capability is dependent on the adaptability of templates. Besides, the search is time-consuming. Alternatively, indices are used to extract the significant values of various images, and then an artificial intelligence mode is constructed to identify objects. However, it is hard to implement the technology into an existing system.

For a vehicle imaging system, the response thereof should be instant, and the recognition algorithm thereof should be exempted from the influence of environmental illumination so that a certain level of reliability can be achieved. The three technologies mentioned above all consume a lot of resources of a digital signal processor to process images. Further, two different algorithms are usually used to deal with different illumination conditions of day and night. To solve the abovementioned problems, the present invention proposes an object position detection device and a method thereof. The present invention converts a 2-D (two-dimensional) image data, such as a road image captured by a vehicle imaging system, into 1-D (one-dimensional) distance-axis signal information. The present invention can all-weather accurately detect an approaching object according to a differential value of the 1-D distance-axis signal information at a single time point and the difference of the 1-D signal information of two adjacent time points. The present invention can apply to existing imaging systems with a higher accuracy and a lower cost.

SUMMARY OF THE INVENTION

The primary objective of the present invention is to provide an object position detection device and a method thereof, which uses a complexity estimation method to convert the captured image into 1-D distance-axis signal information, and performs a numerical differentiation on the 1-D distance-axis signal information to obtain a differential value of the 1-D distance-axis signal information at a single time point. Then, the present invention uses the difference of the 1-D signal information of at least two adjacent time points and the differential value to determine the existence of an object and the approaching status of the object.

The object position detection device of the present invention mainly comprises an image capture unit and an image processing unit. The image capture unit captures images within detected regions in at least one direction. The image processing unit uses a complexity estimation method to convert the captured image into 1-D distance-axis signal information, and performs a numerical differentiation on the 1-D distance-axis signal information to obtain a differential value of the 1-D distance-axis signal information at a single time point. The distance of the object is determined according to whether the differential value of the 1-D distance-axis signal information is greater than or equal to a predetermined threshold. The image processing unit further calculates the difference of the 1-D distance-axis signal information of at least two adjacent time points and determines the approaching status of the object according to whether the difference is greater than or equal to a predetermined threshold. Besides, the image processing unit is coupled to an alert unit. According to the position estimation result of an object, the alert unit generates an alert with a display, LED, a buzzer, or a speaker. The present invention can directly apply to an existing image platform and thus has high convenience and superior compatibility.

Below, the embodiments are described in detail in cooperation with the attached drawings to make easily understood the objectives, technical contents, characteristics and accomplishments of the present invention.

DETAILED DESCRIPTION OF THE INVENTION

The present invention discloses an object position detection device and a method thereof. The present invention continuously captures images in the detected direction and uses a complexity estimation method to convert the captured image into one dimensional (1-D) distance-axis signal information. Next, the present invention performs a numerical differentiation on the 1-D distance-axis signal information to obtain a differential value of the 1-D distance-axis signal information at a single time point. Next, the present invention calculates the difference of the 1-D distance-axis signal information of at least two adjacent time points. Then, the present invention determines the position of the object according to whether the differential value of the 1-D distance-axis signal information is greater than or equal to a predetermined threshold, and determines the approaching status of the object according to whether the difference of the 1-D distance-axis signal information of at least two adjacent time points is greater than or equal to a predetermined threshold, wherein the abovementioned two thresholds may be identical. Thus is detected the approaching status of a moving object.

Figure 1:
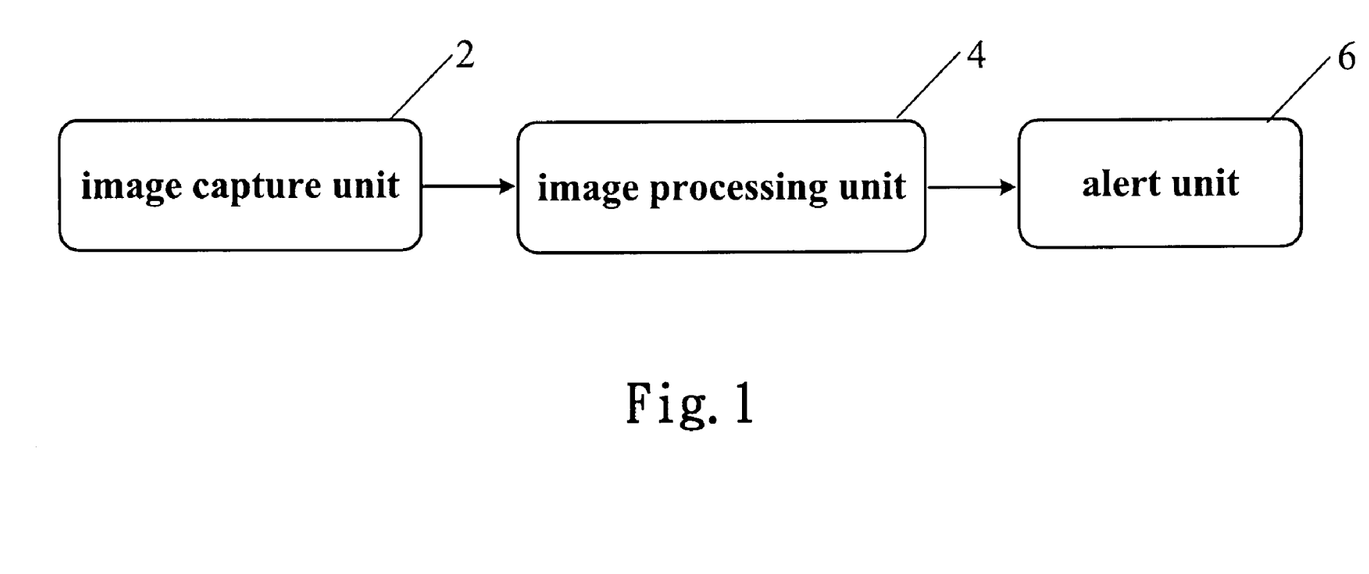
FIG. 1 is a diagram schematically showing the architecture of an object position detection device according to the present invention.
Figure 2:
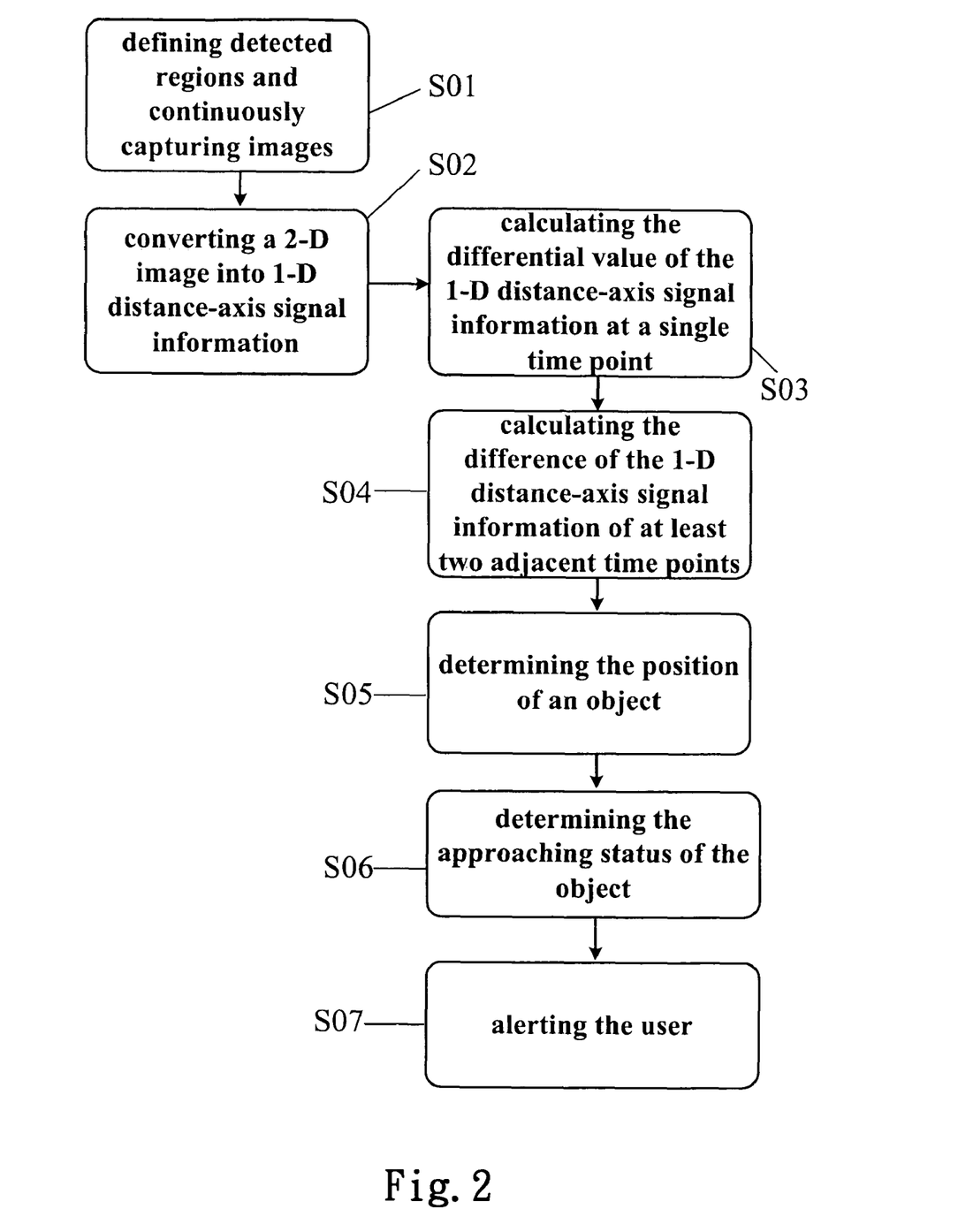
FIG. 2 is a flowchart of a method for detecting an approaching object according to the present invention.
Figure 5:
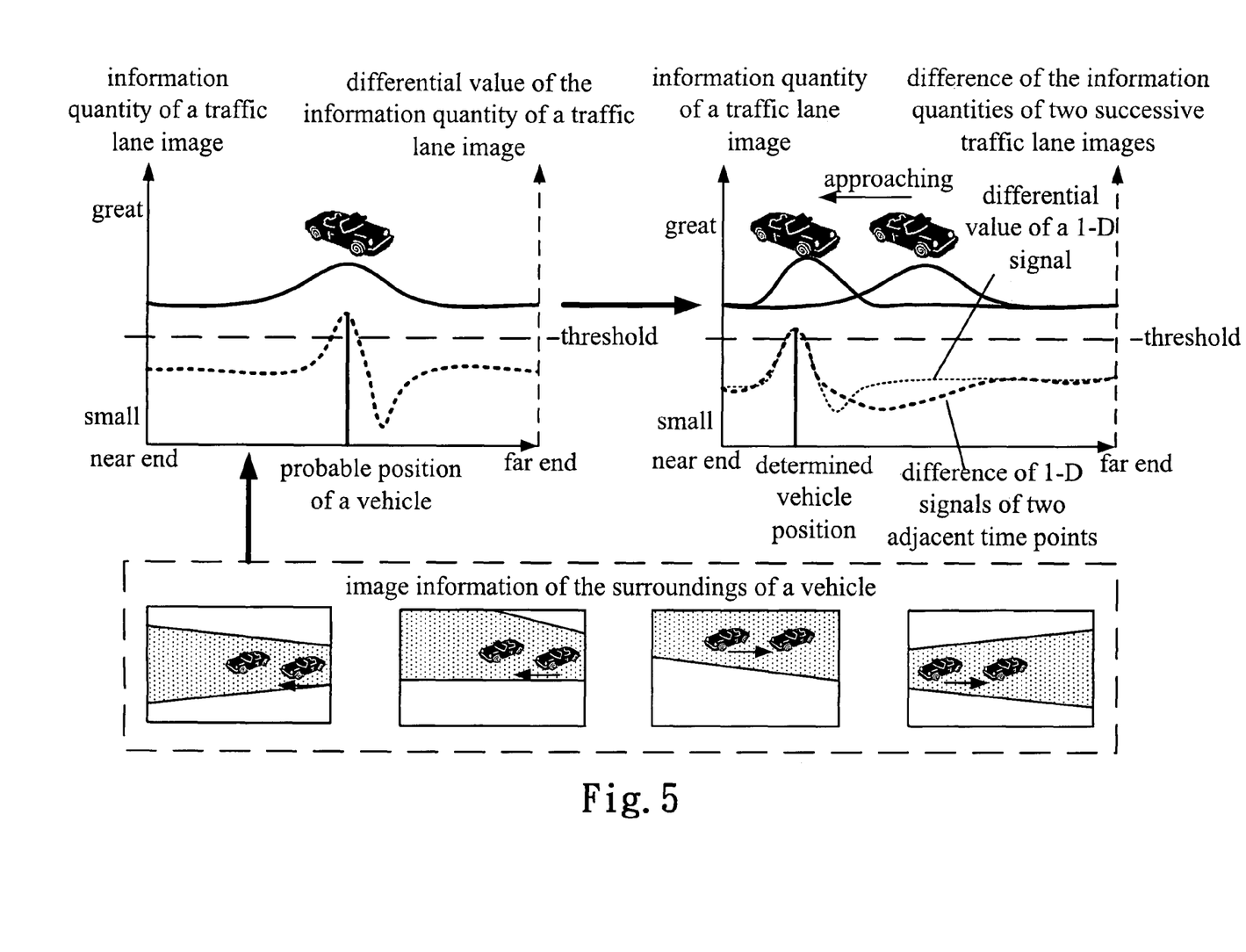
FIG. 5 is a diagram schematically showing the application of the present invention in a vehicle.

Refer to FIG. 1 a diagram schematically showing the architecture of an object position detection device according to the present invention. The object position detection device of the present invention comprises an image capture unit 2 and an image processing unit 4. FIG. 2 is a flowchart of a method for detecting an approaching object according to the present invention. FIG. 5 is a diagram schematically showing the application of the present invention in a vehicle. Refer to FIG. 2 and FIG. 5. In Step S01, the image capture unit 2 captures the images within the detected regions in at least one direction defined by the user. The image capture unit 2 may be a CCD (Charge Coupled Device) camera or a CMOS (Complementary Metal Oxide Semiconductor) camera. The captured image is transmitted to the image processing unit 4. In Step S02, the image processing unit 4 uses a complexity estimation method, such a method of calculating the entropy of the regional image, to work out the information quantities of the images at different distances within the region defined by the user; thus, each 2-D image is converted into 1-D distance-axis signal information (I). In the embodiment shown in FIG. 5, the 1-D distance-axis signal information is the information quantity of a traffic lane image and represented by the solid lines. Below, the present invention will be demonstrated in term of 1-D distance-axis signal information. Refer to Equation (1):

$$I(x) = -\sum_{i=1}^{n} \log(p_i) \times p_i \qquad (1)$$

$$p_i = \frac{G_i}{T_{pixels}}$$

wherein $G_i$ is the number of Gray Level i appearing in the regional image; $T_{pixels}$ is the number of the effective pixels in the regional image; $P_i$ is the probability that Gray Level i appears in the regional image. The attribute of image information is based on the color variation of an image, for an example, the less the colors or the duller the picture, is computed as a smaller the information quantity. When there is another object existing in the detected direction, the quantity of image information may be increased by the colors, shadows, or light of the additional object. Therefore, weather an object is existence or not can be detected by checking the variable quantity of the image information. When the image information quantity is used in object detection, the weather factor will not affect the operation of the image capture unit 2 and the image processing unit 4. Thus, the required computational capability of the image processing unit 4 is greatly reduced, and the rate of realtime feedback is greatly increased. Further, the hardware requirement of the system is lowered.

After the image processing unit 4 obtains the 1-D distance-axis signal information, the process proceeds to Step S03. In Step S03, the image processing unit 4 performs a numerical differentiation on the 1-D distance-axis signal information to obtain a differential value of the 1-D distance-axis signal information at a single time point. In the embodiment shown in FIG. 5, the differential value of the 1-D signal is the differentiated image information of a traffic lane, which is represented by the dotted lines. Below, the differentiated image information will be discussed in term of the differential value of the 1-D signal. Refer to the left part of FIG. 5. The left part of FIG. 5 shows the information quantity and the differential value of the 1-D signal, wherein the dotted-line Y axis represents the differential value of the 1-D signal. From the left part of FIG. 5, it is observed that the differential value of the 1-D signal is obviously greater than a threshold in the position where a vehicle appears. Thus, the position of a vehicle is detected. Refer to the right part of FIG. 5. Then, the image processing unit 4 calculates the difference of the 1-D distance-axis signal information of at least two adjacent time points. The right part of FIG. 5 shows the information quantity and the difference of the 1-D signals of at least two adjacent time points, wherein the dotted-line Y axis represents the difference of the 1-D signals of at least two adjacent time points. From the right part of FIG. 5, it is observed that the difference of the 1-D signals of at least two adjacent time points is obviously greater than a threshold in the position where a vehicle is approaching. Thus, the differential value of the 1-D signal and the difference of the 1-D signals of at least two adjacent time points can be used to crosscheck the approaching of a vehicle.

Step S04 and Step S05 use the information quantities of 1-D signals to determine the position where a vehicle is approaching, wherein numerical differentiation is used to obtain the gradient (I') of the image information quantity, as shown in Equation (2):

$$I'(x) = \frac{I(x) - I(x-a)}{a} \qquad (2)$$

Then, the differential value of the 1-D signal and the difference of the 1-D signals of at least two adjacent time points are respectively compared with predetermined thresholds to see whether both the differential value of the 1-D signal and the difference of the 1-D signals of at least two adjacent time points are greater than the thresholds and determine Position $X_t$ where an object may exist. When the image capture unit 2 is a camera having a resolution of 320×240, the value of the increment "a" will be set to about 10 for an image having real dimensions of 5 m in width and 15 m in length. When the image capture unit 2 is a camera having a resolution of 640× 480, the value of the increment "a" will be set to about 15-20 for an image having real dimensions of 5 m in width and 15 m in length. Therefore, the higher the resolution the image capture unit 2 has, the greater the value the increment "a" may use. Thus, the user can determine the threshold he needs. To detect the movement of an object, in Step S06, the information quantities of two adjacent images $I_t$ and $I_{t+1}$ subtract to attain the difference $\Delta I_{t+1}$ according to Equation (3):

$$\Delta I_{t+1}(x) = I_{t+1}(x) - I_t(x) \tag{3}$$

From the calculation results of $\Delta I_{t+1}$, it is known: When an object moves to Position $X_{t+1}$, the $\Delta I_{t+1}(X_{t+1})$ is the maximum value. In the present invention, a complexity estimation method is used to convert a 2-D image into 1-D distance-axis signal information with, and a numerical differentiation method is used to obtain the differential value of the 1-D distance-axis signal information at a single time point, and the difference of the 1-D distance-axis signal information of at least two adjacent time points is also worked out. Then, it is found: When there is an object approaching in a continuous image, the differential value of the 1-D signal $I_{t+1}'(X_{t+1})$ and the difference of the 1-D signals of at least two adjacent time points $\Delta I_{t+1}(X_{t+1})$ respectively have obvious peaks at Position $X_{t+1}$ where the object appears.

In one embodiment of the present invention, whether an object is approaching can be detected merely via comparing the differential value of the 1-D signal $I_{t+1}'(X_{t+1})$ and the difference of the 1-D signals of at least two adjacent time points $\Delta I_{t+1}(X_{t+1})$ with a simple threshold value θ. If the approaching of an object is detected, the distance between the detected object and the detector will decrease with the time elapsed, which can further confirm that there is indeed an approaching object. In Step S07, when the image processing unit 4 finds that an object has approached the alert limit set by the user, the image processing unit 4 alerts the user with an alert unit 6 coupled to the image processing unit 4. The alert unit 6 may be a display, LED, a buzzer, or a speaker.

Figure 3:
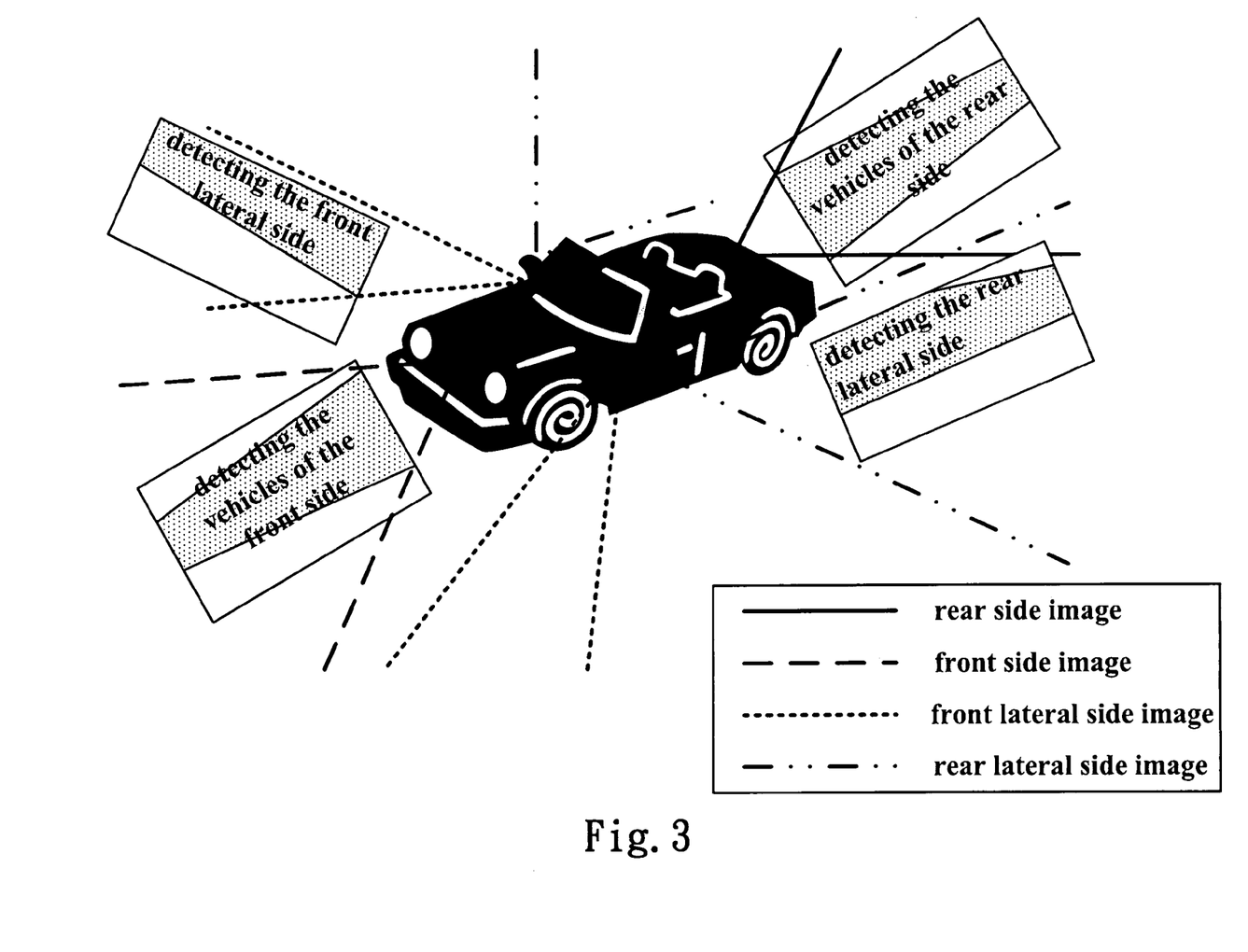
FIG. 3 is a diagram schematically showing the detected regions of an object position detection device according to the present invention.
Figure 4:
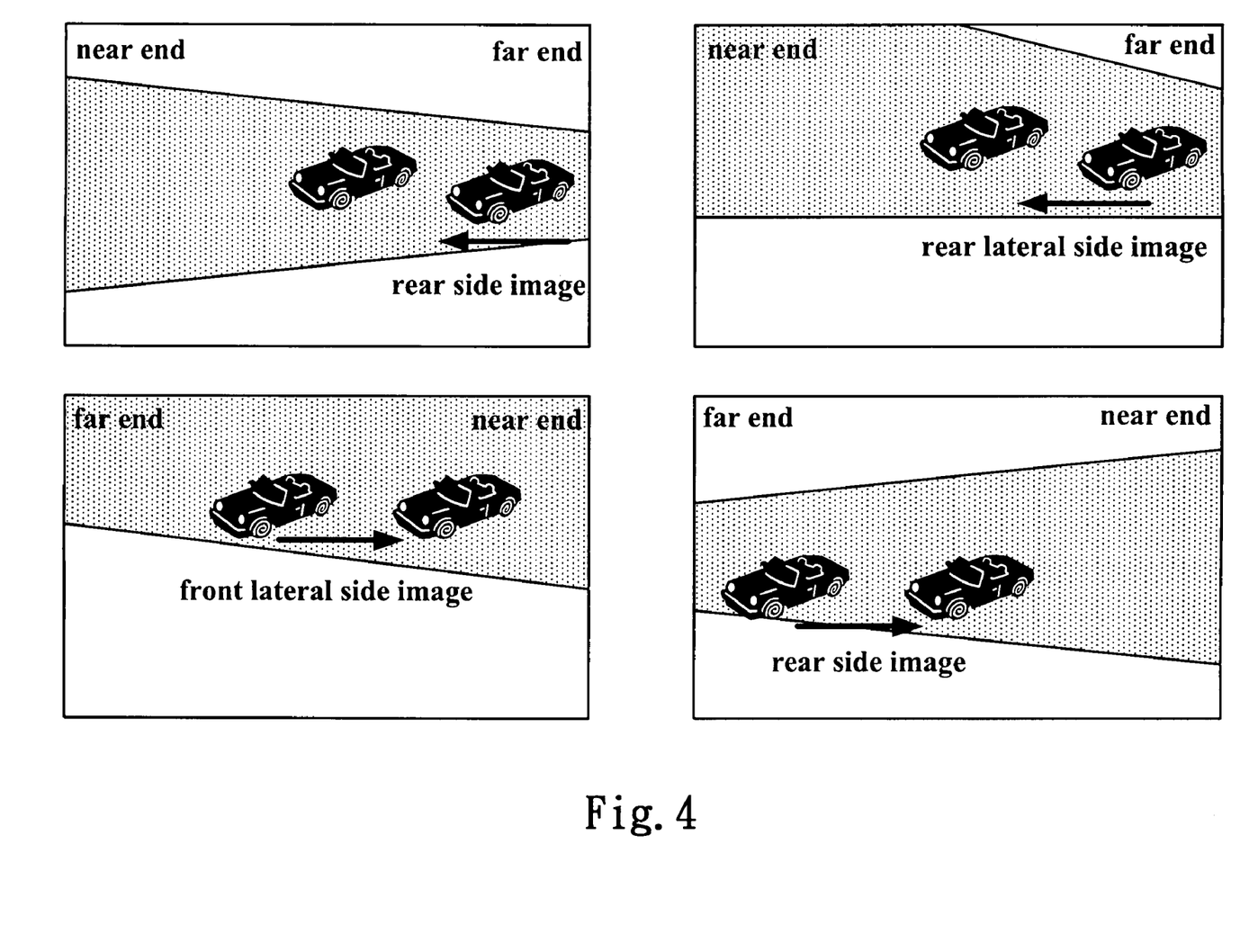
FIG. 4 is a diagram schematically showing the captured images of an object position detection device according to the present invention.

Refer to FIG. 3 a diagram schematically showing the object position detection device is applied to an existing vehicle imaging system according to one embodiment of the present invention. As shown in FIG. 3, the front side, rear side, front lateral sides and rear lateral sides are the regions usually detected. Therefore, the image capture units are arranged in the related sites to continuously capture images in the above-mentioned regions, as shown in FIG. 4. Among vehicle detection systems, the blind-spot detection system is the one most desired by drivers. The present invention can also apply to the blind-spot detection system. In the application to the blind-spot detection system, the image capture units are respectively arranged on the rear-view mirrors at two sides of a vehicle and faced the blind spots of the vehicle's rear lateral direction. When a vehicle is approaching the blind spot, the blind-spot detection system alerts the driver. As mentioned above, the captured image is converted into 1-D distance-axis signal information with a complexity estimation method, and the 1-D distance-axis signal information is converted into a differential value of the 1-D distance-axis signal information at a single time point with a numerical differentiation method. Due to the attribute of image information is based on the color variation of an image, the picture containing only gray roads and white lane marks is computed as a lower information quantity. As shown in FIG. 5, the picture containing a vehicle on the road has a higher information quantity because of the color, shadow, steel wheels and lights of the vehicle. Therefore, the position of a moving object can be successfully determined according to the difference of the 1-D signal information of at least two adjacent time points. Thus, the present invention can detect an approaching object without using any radar. The present invention can apply to any vehicle imaging system and needs only limited computational capability. Therefore, the present invention can be directly used in platforms of vehicle imaging system, such as DSP, FPGA, SoC and Car PC. In the present invention, the approaching-object detection and alert system is based on the image processing unit, and a system modulation interface can be used to adjust the view field of the system to capture different views. Further, the present invention is not affected by illumination or weather but can keep working to detect objects and alert users. Therefore, the present invention realizes an all-weather object position detection device and a method thereof.

Figure 6:
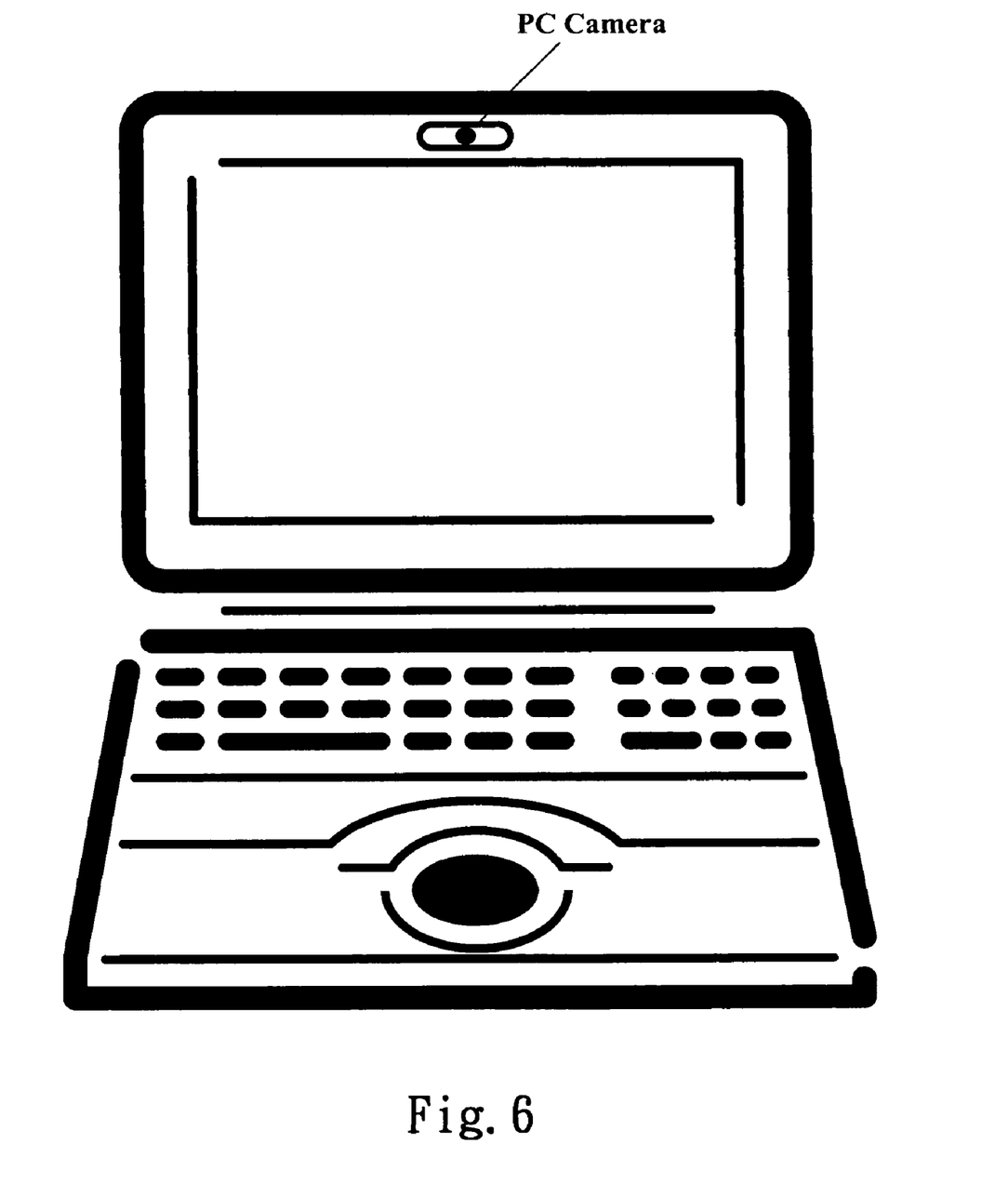
FIG. 6 is a diagram schematically showing another embodiment of the present invention.

Refer to FIG. 6 a diagram schematically showing the object position detection device is applied to a notebook/desktop computer having a video function according to another embodiment of the present invention. Notebook computers usually have a PC camera (web digital camera) on the top of the screen or another place. Equipping a computer with the object detection function of the present invention can upgrade the operating system and convenience the user. For example, the present invention can enable the computer to automatically open a login page when a person or an object is approaching, and enable the computer to automatically enter the protection mode or the sleep mode when the user leaves. Similarly to the process mentioned above, the digital camera captures an image; then, the captured image is converted into 1-D distance-axis signal information with a complexity estimation method, and the 1-D distance-axis signal information is converted into a differential value of the 1-D distance-axis signal information at a single time point with a numerical differentiation method. The difference of the 1-D distance-axis signal information of at least two adjacent time points is also worked out. The position of the user or the approaching status of an object can be dynamically determined according to the difference of the 1-D distance-axis signal information of at least two adjacent time points. The present invention can also be applied to a monitoring system to promote safety and provide higher expandability. Fox example, when applied to ATM (Auto Teller Machine), the present invention can enable ATM to automatically make a greeting or a voice advertisement when a user is approaching, and can enable ATM to automatically detect whether another is approaching when the user is withdrawing money. Thereby, the safety of withdrawers is promoted. The object position detection algorithm of the present invention can be realized by simple software and used in most of image capture systems. The present invention can enable most of image capture systems to detect an object without using any radar. The present invention can expand functions of various electronic systems without increasing the cost. Further, the present invention has superior stability and accuracy because the present invention is not affected by weather. Therefore, the present invention is a highly utility innovation.

The embodiments described above are only to exemplify the present invention but not to limit the scope of the present invention. Therefore, any equivalent modification or variation according to the shapes, structures, characteristics or spirit of the present invention is to be also included within the scope of the present invention.

What is claimed is:

1. An object position detection device comprising:
   at least one image capture unit capturing images of at least one region; and
   an image processing unit converting a captured image into one-dimensional distance-axis signal information with an image complexity estimation method, performing numerical differentiation on said one-dimensional distance-axis signal information to obtain a differential value of said one-dimensional distance-axis signal information at a single time point, and using said differential value of said one-dimensional distance-axis signal information to determine a position of an object,
   wherein said image complexity estimation method is a regional image entropy estimation method.

2. The object position detection device according to claim 1, wherein said image capture unit is a CCD (Charge Coupled Device) camera or a CMOS (Complementary Metal Oxide Semiconductor) camera.

3. The object position detection device according to claim 1, wherein said image processing unit has a threshold, and determines a position of an object according to whether said differential value of said one-dimensional distance-axis signal information is greater than or equal to said threshold.

4. The object position detection device according to claim 1, wherein said image processing unit is coupled to an alert unit, and said image processing unit determines whether said alert unit alerts users according to a position detection result.

5. The object position detection device according to claim 4, wherein said alert unit generates an alert with a display, a light emitting diode, a buzzer, or a speaker.

6. A object position detection device comprising:
   at least one image capture unit capturing images of at least one region; and
   an image processing unit converting a captured image into one-dimensional distance-axis signal information with an image complexity estimation method, performing numerical differentiation on said one-dimensional distance-axis signal information to obtain a differential value of said one-dimensional distance-axis signal information at a single time point, working out a difference of said one-dimensional distance-axis signal information of at least two adjacent time points, and using said difference of said one-dimensional distance-axis signal information of at least two adjacent time points to determine an approaching status of an object,
   wherein said image complexity estimation method is a regional image entropy estimation method.

7. The object position detection device according to claim 6, wherein said image processing unit has a threshold, and determines a position of an object according to whether said differential value of said one-dimensional distance-axis signal information is greater than or equal to said threshold.

8. The object position detection device according to claim 7, wherein said image processing unit determines an approaching status of an object according to whether said difference of said one-dimensional distance-axis signal information of at least two adjacent time points is greater than or equal to said threshold.

9. The object position detection device according to claim 6, wherein said image capture unit and said image processing unit are mounted on a vehicle; said at least one region includes a front side, a rear side, a front lateral side and a rear lateral side of a vehicle.

10. The object position detection device according to claim 9, wherein said image capture unit is mounted on a rear-view mirror of at least one side of a vehicle to capture images of at least one rear lateral side of said vehicle.

11. The object position detection device according to claim 6, wherein said image processing unit is coupled to an alert unit, and said image processing unit determines whether said alert unit alerts users according to a object position detection result.

12. A object position detection method comprising:
    capturing images of at least one region;
    converting a captured image into one-dimensional distance-axis signal information with an image complexity estimation method;
    performing numerical differentiation on said one-dimensional distance-axis signal information to obtain a differential value of said one-dimensional distance-axis signal information at a single time point; and
    using said differential value of said one-dimensional distance-axis signal information to determine a position of an object,
    wherein said image complexity estimation method is a regional image entropy estimation method.

13. The object position detection method according to claim 12, wherein said position of said object is determined according to whether said differential value of said one-dimensional distance-axis signal information is greater than or equal to a threshold.

14. The object position detection method according to claim 12 further comprising working out a difference of said one-dimensional distance-axis signal information of at least two adjacent time points.

15. The object position detection method according to claim 14 further comprising setting a threshold, wherein an approaching status of an object is determined according to whether said difference is greater than or equal to said threshold.

* * * * *